(12) United States Patent  
Wang et al.

(10) Patent No.: US 7,092,128 B2
(45) Date of Patent: Aug. 15, 2006

(54) APPLICATION OF GLOSSMARKS FOR GRAPHICS ENHANCEMENT

(75) Inventors: Shen-ge Wang, Fairport, NY (US); Beilei Xu, Penfield, NY (US); Chu-heng Liu, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 1000 days.

(21) Appl. No.: 10/159,432

(22) Filed: May 30, 2002

(65) Prior Publication Data

US 2004/0156078 A1  Aug. 12, 2004

(51) Int. Cl.
*H04N 1/405* (2006.01)
*H04N 1/52* (2006.01)

(52) U.S. Cl. .................. 358/3.06; 358/3.17; 358/3.19; 358/3.2; 358/3.28

(58) Field of Classification Search ................ 358/1.9, 358/3.06, 3.13–3.2, 3.09, 3.26–3.28, 533–536; 382/270
See application file for complete search history.

(56) References Cited

U.S. PATENT DOCUMENTS

| | | |
|---|---|---|
| 4,210,346 A | 7/1980 | Mowry, Jr. et al. |
| 4,310,180 A | 1/1982 | Mowry, Jr. et al. |
| 5,087,507 A | 2/1992 | Heinzer |
| 5,487,567 A | 1/1996 | Volpe |
| 5,583,660 A | 12/1996 | Rylander |
| 5,678,133 A | 10/1997 | Siegel |
| 5,695,220 A | 12/1997 | Phillips |
| 5,734,752 A | 3/1998 | Knox |
| 5,788,285 A | 8/1998 | Wicker |
| 5,853,197 A | 12/1998 | Mowry, Jr. et al. |
| 6,108,512 A | 8/2000 | Hanna |
| 6,606,168 B1 * | 8/2003 | Rylander .................. 358/3.09 |
| 6,714,320 B1 * | 3/2004 | Nakahara et al. .......... 358/3.13 |
| 6,906,825 B1 * | 6/2005 | Nakahara et al. ............ 358/1.9 |

FOREIGN PATENT DOCUMENTS

| | | |
|---|---|---|
| EP | 0 859 506 A1 | 8/1998 |
| GB | 2 217 258 A | 10/1989 |

* cited by examiner

*Primary Examiner*—Scott A. Rogers
(74) *Attorney, Agent, or Firm*—Christopher D. Wait

(57) ABSTRACT

The present invention relates to providing a designer with the tools for the manipulation of differential gloss in halftoned images. A special mask layer is provided for the rendering of desired glossmark image data. The desired glossmark image data is used to select between two halftones with anisotropic structure characteristics which are significantly different in orientation while remaining identical in density. This selection is made for each corresponding portion of primary image data. In this way, a halftone image of the primary image is generated with glossmarks imbedded therein which will display differential gloss without the need for special toners or paper.

25 Claims, 4 Drawing Sheets

PARALLEL  PERPENDICULAR

APPLICATION OF GLOSSMARKS FOR GRAPHICS ENHANCEMENT

RELATED CASES

Cross reference is made to the following related application incorporated by reference herein: application Ser. No. 10/159,423, entitled "HALFTONE IMAGE GLOSS CONTROL FOR GLOSSMARKS" to inventors Shen-ge Wang, Beilei Xu, and Chu-heng Liu.

BACKGROUND

The present invention relates generally the gloss inherent in the hardcopy of image data be it pictorial or text as generated by graphic design artists. More particularly, this invention relates to halftoned image data and the control of differential gloss when that halftone image data is printed into hardcopy for the graphic arts.

There is an ever constant desire and need within the advertising and graphic arts to provide printed matter, be it posters, brochures, or magazines, in new and fresh ways which will appeal to the eye anew. One such approach is to provide gloss image overlays or glossmarks. However, heretofore such a technique has not proven popular. This is basically because either the client is unwilling to pay extra for the effect or the additional required processing has been too onerous to schedule or otherwise reliably juggle within the industry. The hurdles are essentially the need for special toners or paper or both, combined with any special handling issues.

There has been a need for a printer that can print a page that will provide localized gloss control. One method, described in U.S. Pat. Nos. 4,210,346 and 5,695,220, is to use a particular white toner and a particular white paper that are designed to have different diffused light characteristics at different angles. Of course, this system requires special, matched paper and toner.

In U.S. Pat. No. 6,108,512 to Hanna, the invention described discloses a system for producing non-copyable prints. In a xerographic printer, text is printed using clear toner. Thus, the only optical difference between toner and non-toner portions of the page is in the reflectivity. The plastic toner will reflect more light than the paper. A human reader can now read the image by holding the page at such an angle that the eye will intercept the reflected light from the toner, producing a contrast between the lighter appearing toner and the darker appearing paper. However, a copier scanner is always set up to avoid reflected light, by supplying light at an oblique angle and reading at a right angle. In this case, the diffused light is approximately equal for both toned and untoned surfaces, the scanner will detect no difference and the copier will not be able to copy the original.

All of the above are herein incorporated by reference in their entirety for their teaching.

Therefore, as discussed above, there exists a need within the marketing, advertising and graphics art industries for an arrangement and methodology which will enable gloss control and allow manipulation for glossmarks without requiring special toners/inks or paper/substrates or special handling. Thus, it would be desirable to solve this and other deficiencies and disadvantages as discussed above with an improved methodology for the manipulation of perceived gloss in graphic art documents and product.

The present invention relates to a method for a designer to provide glossmarks in a halftone image comprising the steps of providing a unique mask level with desired glossmark data and providing primary image data. This is then followed by using the unique mask level data to toggle the selection of either a first halftone having a first anisotropic structure orientation or a second halftone having a second anisotropic structure orientation different from that of the first halftone, where the first halftone is used for at least some portion of the primary image data and the second halftone is used for the remaining portion of the primary image data in rendering the halftone image.

In particular, the present invention relates to a method for a designer to provide glossmarks in a halftone image comprising the steps of providing a unique mask level with desired glossmark data and providing primary image data. This is then followed by using the unique mask level data to toggle the selection of either a first halftone having a first anisotropic structure orientation or a second halftone different from that of the first halftone, where the first halftone is used for at least some portion of the primary image data and the second halftone is used for the remaining portion of the primary image data in rendering the halftone image.

The present invention also relates to a method for a designer to provide glossmarks in a halftone image comprising the steps of providing a unique mask level with desired glossmark data and providing primary image data. This is then followed by using the unique mask level data to toggle the selection of either a first halftone having a first anisotropic structure orientation, or a second halftone having a second anisotropic structure orientation different from that of the first halftone, or a third halftone having a structure different from both the first halftone and the second halftone, where the first halftone is used for at least some portion of the primary image data, and the second halftone is used for another portion of the primary image data, and the third halftone is used for the remaining portion of the primary image data in rendering the halftone image.

DESCRIPTION

By proper utilization of the perceived differential gloss inherent between various anisotropic halftone dot structures, the desired manipulation of perceived gloss and the generation of glossmarks via that differential gloss may be achieved without the need for special paper or special toners or inks. A graphic artist by usage of a duly designated mask layer as employed within a suitable graphics design program as operating on a computer may readily utilize gloss control as an enhancement effect for artistic expression or special effects.

Figure 1:
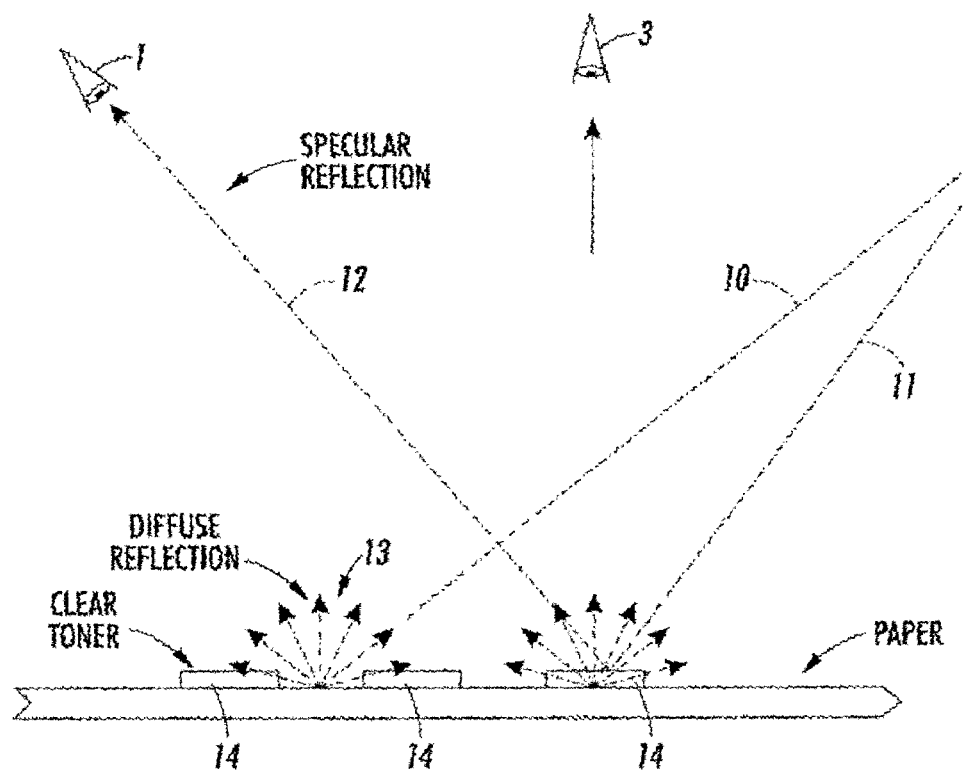
FIG. 1 shows how the human eye can detect a large difference between the glossy portions of the page but a scanner detector cannot.

FIG. 1 shows how the human eye 1 can read gloss image upon a page from on an angle where from straight on it cannot. Three glossy areas 14 are shown. One ray of light 10 from the light source 2 hits the paper at a point where there is no gloss toner 14 and the reflected light 13 is diffused so that there is only a small amount of light in all directions, including the direction toward the human eye 1. Another ray of light 11 of equal intensity touches the paper at a point where there is gloss toner 14. Here there is a large amount of reflected light 12 in the indicated direction. If the human eye 1 is positioned as shown, a large difference between glossy and non-glossy toner areas is readily observable by the human eye 1. However, a human eye at 3 reads mostly incident light only at right angles to the paper. In this case there is only a small amount of diffused light coming from both the glossy and non-glossy dots, and the observer cannot detect a difference. This is one prior art approach for creating a gloss image which requires special toner.

Figure 2:
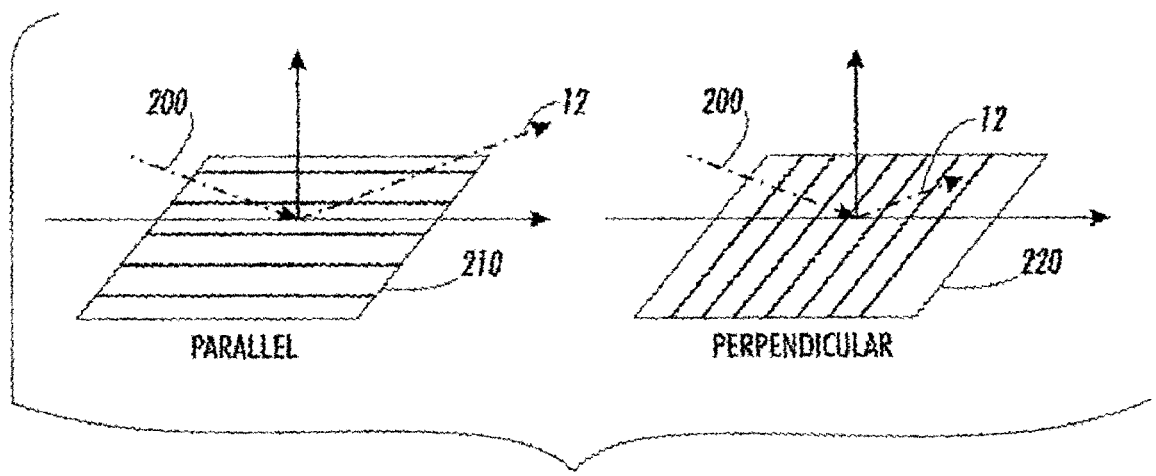
FIG. 2 depicts a differential gloss found in simple line-screen halftones.

Heretofore, there has been little appreciation for the fact that the inherent reflective and diffusive characteristics of halftones may be manipulated to be directive of incident light as about an azimuth by use of a halftone structure which is anisotropic in nature. A mirror is equally reflective regardless of the azimuth of the light source relative to the plane of the mirror. Similarly, an ordinary blank paper is equally reflective and diffusive regardless of the azimuth of the light source. However, printed matter can and will often display differing reflective and diffusive characteristics depending upon the azimuth of origin for a light source relative to the structural orientation of the halftone. Such reflective characteristics when maximized are exhibited in a halftone with a structure which is anisotropic in nature. In other words, the indicatrix used to express the light scattered or reflected from a halftone dot will maximally vary depending upon the halftone dot's azimuth orientation to the light source when that halftone has an anisotropic structure. FIG. 2 provides an example of the present invention and of what is meant by anisotropic structure.

In FIG. 2, a simple line-screen halftone of anisotropic nature is presented in two orientations relative to impinging incident light 200, a parallel orientation 210 and a perpendicular orientation 220. Both halftone dot orientations are selected to be similar in density so that the diffuse light and incident light at orthogonal angles to the paper are equal. In this way the light which is available to scanner 3 or to the human eye from straight on is the same. However, the specular reflected light 12 is considerably greater for the anisotropic parallel orientation 210. If as printed, a mass of the 210 parallel orientation halftones are butted directly adjacent to a mass of 220 perpendicular orientation halftones, there will be a difference in reflected light between them, which when viewed from an angle will be perceived as a shift in gloss differential or a glossmark. The perceptibility of this gloss differential will be maximized when the halftone anisotropic orientations are 90 degrees apart as shown here in FIG. 2.

Figure 3:
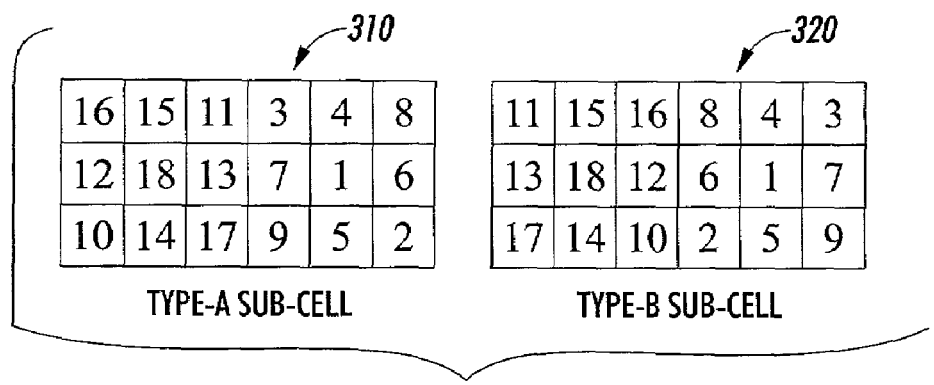
FIG. 3 shows two 3×6 halftone patterns suitable in anisotropic structure to produce discernable gloss differential for practicing the present invention.
Figure 4:
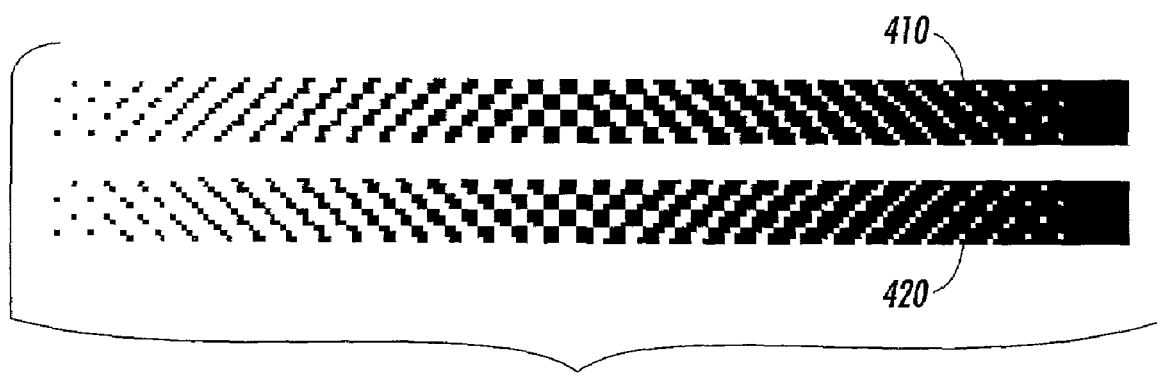
FIG. 4 is a density sweep of the two halftone patterns of FIG. 3.

FIG. 3 shows example halftone cells suitable for a skilled practitioner to employ in an embodiment employing the teachings of the present invention. They are but one useful example as will be evident to those skilled in the art. Each halftone cell is comprised as a three by six pixel array. The turn on/off sequence is numerically indicated. Note the diagonal orientation of the pixel numbering. The type-A sub-cell 310 and type-B sub-cell 320 both have a 45 degree orientation, one to the right and the other to the left. This orientation can be clearly seen in the density sweeps 410 and 420 of FIG. 4. To maximize the perceptibility of the gloss differential, the orientations of sub-cells type-A and type-B are arranged 90 degrees apart one from the other.

Figure 5:
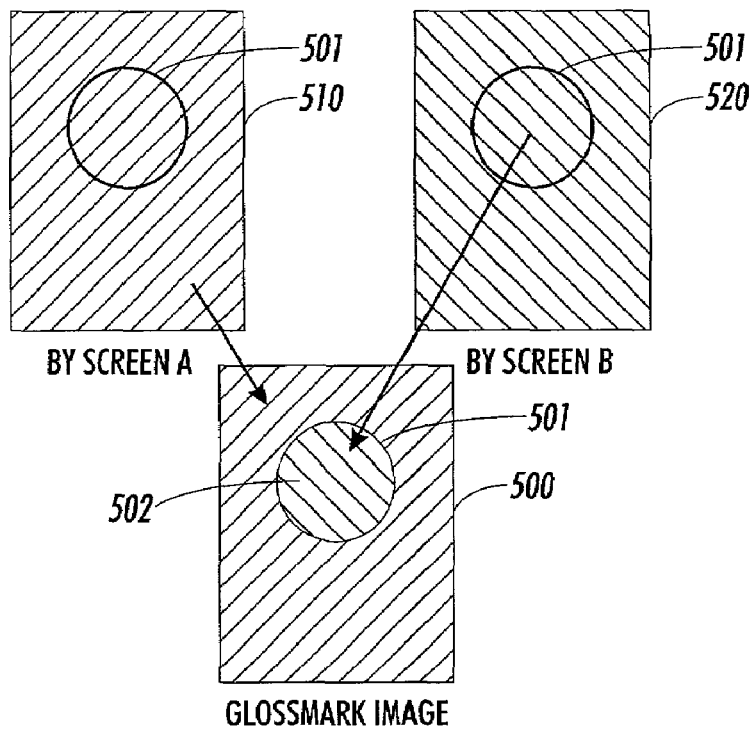
FIG. 5 depicts a patchwork alternating of the two halftone patterns of FIG. 3 so as to achieve a glossmark.

FIG. 5 depicts a glossmark image 500 achievable using halftone cells as described above. Screen-A 510 uses one halftone cell type and screen-B 520 uses the other. The circle 501 is provided as a visual aid across the image screens 500, 510 and 520. The desired glossmark here is for a sphere 502 to be perceived in the midst of image 500. Screen-A 510 provides the field of right diagonal oriented anisotropic halftones and screen 520 provides the spherical area of left diagonal oriented anisotropic halftone cells. In this manner, a selection of the two screen types are patch-worked together to create the glossmark image 500.

Figure 6:
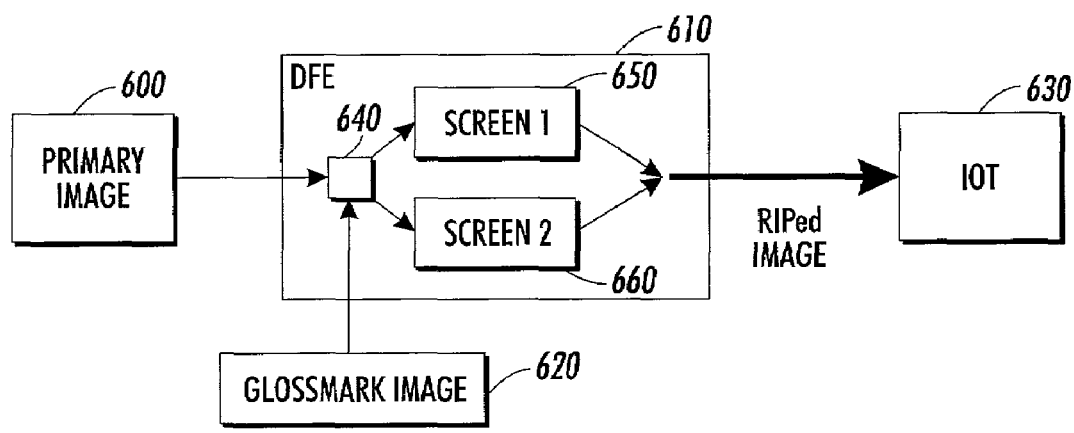
FIG. 6 shows one embodiment for achieving the image directed alternation of the halftone patterns for glossmarks as depicted in FIG. 5, utilizing the halftone patterns of FIG. 3.

An another approach for the assembly of a glossmark image is diagramed in FIG. 6. Here, the primary image 600 is received as input data to the digital front-end (DFE) 610 as is normal. However, a desired glossmark image 620 is also received as input data to the DFE 610 as well. The processed image as sent to the image output terminal (IOT) 630 is gray-scaled, the halftone density being driven by the primary image 600 data as is normal. However, the halftone type selection is driven by the intended glossmark image data 620 as input to multiplexer switch 640. The intended glossmark image data 620 will serve to direct a portion of the primary image 600 to use a first anisotropic structured halftone while directing an alternative halftone to be used for the remainder of primary image 600. As will be understood by those skilled in the art, the intended glossmark image data 620 may be flattened into simple zero and one pixel data representations if needed in the DFE 610. This pattern of zero and ones are then used to toggle the multiplexer 640 to one halftone anisotropic structure orientation type or the other. Multiplexer 640 therefore toggles between either screen 1 type halftone 650 or screen 2 halftone type 660 as dictated by the desired glossmark data 620 to produce the composite result of raster input processed (RIP) image data as passed to the IOT 630. In this way, a superimposition of a pattern 620 is imbedded into the primary image 600 which can only be perceived as a gloss differential glossmark.

As will be appreciated by those skilled in the art, one desirable way in which a graphics designer can generate glossmark image data 620 would be by use of a computer loaded with an appropriate software application. One suitable example of such a software application would be CorelDraw®, although there are others. In such a suitable software application, it is possible for the designer to designate a unique mask layer within the program for the depiction of glossmark image data.

Figure 7:
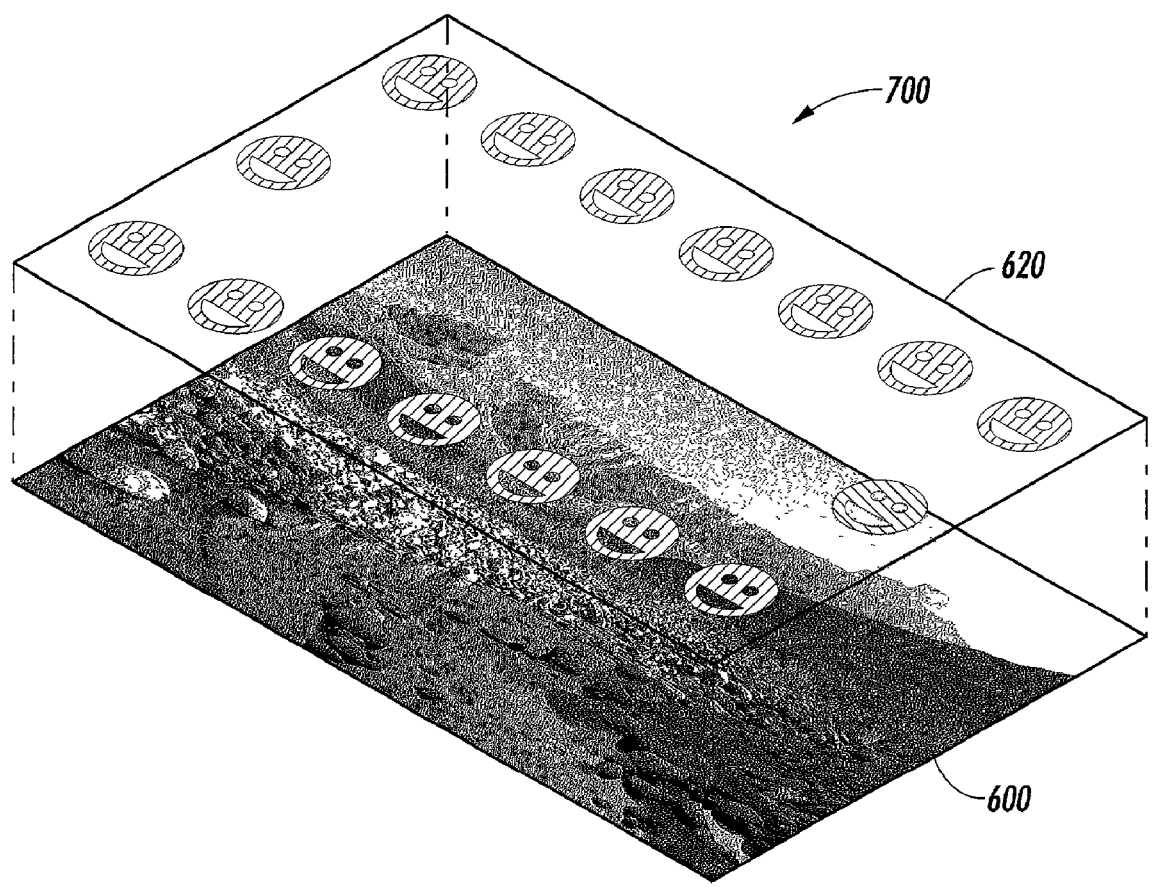
FIG. 7 shows an example of desired glossmark data superimposed above a primary image.

In FIG. 7, there is shown by superimposition an example of the kind of mask layer/level that is discussed above. Typical primary image data 600 is scanned in or created from scratch. In this example, the primary image data 600 just happens to be a mountain landscape. A unique mask layer 700 has been defined as a repository for the intended glossmark data 620. In this instance, that glossmark data just happens to be a number of happy faces though, of course, it could anything and is only limited by the designer's imagination. For example, some possible effects might be to provide sheen or highlight effects or reflection ripples on water and so on. In any case, the mask level 700 provides glossmark data 620 as input to the DFE 610. So that in this example the portions of image data 600 corresponding to the overlay of happy faces would be rendered with a first anisotropic structured halftone 650. The remaining portion of primary image data 600 corresponding to the field area of mask level 700 would be rendered with a second anisotropic structured halftone 660 as discussed above.

In closing, by using a designed mask layer to direct the alternating between two halftone types, the two halftones carefully selected such that each has identical matching density characteristics while displaying distinctly different anisotropic structure orientations, will enable the super imposition of a designer glossmark data without the need or cost for special toners or paper. This manipulation of gloss differentials will, of course, be best utilized with toner/ink and substrate systems which themselves best display inherent gloss characteristics. Examples of such systems comprise electrostaticgraphic and quality ink-jet systems. While wax based systems typically have less inherent gloss they may well prove amendable to techniques which increase their inherent gloss. In just such a scenario, the teachings herein are anticipated to apply such wax based systems as well. It will be appreciated by those skilled in the art that these teachings will apply to both monochromatic, black and white, as well as color images and upon plain paper, glossy paper or transparencies. Those skilled in the art will also understand that this manipulation of inherent anisotropic gloss differential will be weak where either there is a solid black area (solid toner/ink) or a white and therefore toner-less/ink-less area. That is because these areas will not best exhibit the anisotropic structures of the selected halftones.

While the embodiments disclosed herein are preferred, it will be appreciated from this teaching that various alternative modifications, variations or improvements therein may be made by those skilled in the art. For example, it will be understood by those skilled in the art that the teachings provided herein may be applicable to many types of halftone cell types and arrangements including selecting more than two different halftone structures, as well being applicable to many types of toner/ink and substrate types. All such variants are intended to be encompassed by the following claims.

The invention claimed is:

1. A method for a designer to provide glossmarks in a halftone image comprising the steps of:
   providing a unique mask level with desired glossmark data;
   providing primary image data; and
   using the unique mask level data to toggle the selection of either a first halftone having a first anisotropic structure orientation or a second halftone having a second anisotropic structure orientation different from that of the first halftone, where the first halftone is used for at least some portion of the primary image data and the second halftone is used for the remaining portion of the primary image data in rendering the halftone image.

2. The method of claim 1 wherein the first anisotropic structure orientation and the second anisotropic structure orientation are 90 degrees apart.

3. The method of claim 2 wherein the first anisotropic structure has a parallel orientation, and the second anisotropic structure has perpendicular orientation.

4. The method of claim 3 wherein the first and second halftones are line type halftones.

5. The method of claim 3 wherein the first and second halftones are dot type halftones.

6. The method of claim 2 wherein the first anisotropic structure has a 45 degree orientation to the right, and the second anisotropic structure has a 45 degree orientation to the left.

7. The method of claim 1 wherein the first anisotropic structure orientation and the second anisotropic structure orientation are less than 90 degrees apart.

8. The method of claim 1 wherein the halftone image is intended for an ink jet printer.

9. The method of claim 1 wherein the halftone image is intended for an electrostaticgraphic printer.

10. The method of claim 1 wherein the halftone image is intended for printing upon paper.

11. The method of claim 1 wherein the halftone image is intended for printing upon a transparency.

12. A method for a designer to provide glossmarks in a halftone image comprising the steps of:
    providing a unique mask level with desired glossmark data;
    providing primary image data; and
    using the unique mask level data to toggle the selection of either a first halftone having a first anisotropic structure orientation or a second halftone different from that of the first halftone, where the first halftone is used for at least some portion of the primary image data and the second halftone is used for the remaining portion of the primary image data in rendering the halftone image.

13. The method of claim 12 wherein the second halftone is a stochastic type.

14. The method of claim 12 wherein the second halftone is a cluster dot type.

15. The method of claim 12 wherein the halftone image is intended for an ink jet printer.

16. The method of claim 12 wherein the halftone image is intended for an electrostaticgraphic printer.

17. A method for a designer to provide glossmarks in a halftone image comprising the steps of:
    providing a unique mask level with desired glossmark data;
    providing primary image data; and
    using the unique mask level data to toggle the selection of either a first halftone having a first anisotropic structure orientation, or a second halftone having a second anisotropic structure orientation different from that of the first halftone, or a third halftone having a structure different from both the first halftone and the second halftone, where the first halftone is used for at least some portion of the primary image data, and the second halftone is used for another portion of the primary image data, and the third halftone is used for the remaining portion of the primary image data in rendering the halftone image.

18. The method of claim 17 wherein the first anisotropic structure orientation and the second anisotropic structure orientation are 90 degrees apart.

19. The method of claim 17 wherein the first anisotropic structure orientation and the second anisotropic structure orientation are less than 90 degrees apart.

20. The method of claim 18 wherein the third halftone has an anisotropic structure orientation different from both the first halftone and the second halftone.

21. The method of claim 18 wherein the third halftone is a stochastic type of halftone.

22. The method of claim 18 wherein the third halftone is a cluster dot type of halftone.

23. The method of claim 21 wherein the first anisotropic structure has a 45 degree orientation to the right, and the second anisotropic structure has a 45 degree orientation to the left.

24. The method of claim 23 wherein the halftone image is intended for an electrostaticgraphic printer.

25. The method of claim 23 wherein the halftone image is intended for an ink jet printer.

* * * * *